United States Patent
Grisvard et al.

(10) Patent No.: US 9,715,328 B2
(45) Date of Patent: Jul. 25, 2017

(54) MISSION SYSTEM ADAPTED FOR USE IN A STRONGLY DISTURBED ENVIRONMENT PERTURBED BY MOVEMENTS OF THE CARRIER

(75) Inventors: Olivier Grisvard, Treglonou (FR); Marc Dauplait, Brest (FR); Christophe Huntzinger, Brest (FR); Michel Kermarrec, Brest (FR); Pierre Laborde, Brest (FR); Michel Lilette, Brest (FR)

(73) Assignee: THALES, Courbevoie (FR)

( * ) Notice: Subject to any disclaimer, the term of this patent is extended or adjusted under 35 U.S.C. 154(b) by 687 days.

(21) Appl. No.: 14/123,080

(22) PCT Filed: May 30, 2012

(86) PCT No.: PCT/EP2012/060163
§ 371 (c)(1),
(2), (4) Date: Jul. 1, 2014

(87) PCT Pub. No.: WO2012/163973
PCT Pub. Date: Dec. 6, 2012

(65) Prior Publication Data
US 2014/0310632 A1    Oct. 16, 2014

(30) Foreign Application Priority Data
Jun. 1, 2011 (FR) .................................. 11 01683

(51) Int. Cl.
*G06F 3/0484*    (2013.01)
*G06F 3/0482*    (2013.01)
*F16M 13/02*    (2006.01)
*G06F 3/0354*    (2013.01)
*G06F 3/0488*    (2013.01)

(52) U.S. Cl.
CPC .......... *G06F 3/0484* (2013.01); *F16M 13/02* (2013.01); *G06F 3/03547* (2013.01); *G06F 3/0482* (2013.01); *G06F 3/04886* (2013.01); *F16M 2200/08* (2013.01)

(58) Field of Classification Search
CPC ........................... G06F 3/0482; G06F 3/0484
USPC ........................................................ 715/771
See application file for complete search history.

(56) References Cited

U.S. PATENT DOCUMENTS

| 2004/0049743 A1* | 3/2004 | Bogward ................ G06F 1/162 715/262 |
| 2006/0133016 A1 | 6/2006 | North et al. |
| 2009/0198392 A1* | 8/2009 | Eicke ................... G01C 23/005 701/3 |

FOREIGN PATENT DOCUMENTS

FR    2897172 A1    8/2007

* cited by examiner

*Primary Examiner* — Andrea Leggett
(74) *Attorney, Agent, or Firm* — Baker & Hostetler LLP

(57) ABSTRACT

A mission system, able to be fixed in a carrier, comprises at least a display device displaying at least mission data, a processing device allowing the execution of applications, and an interfacing with said display device and with inputting device, the mission system furthermore comprising a handle disposed in proximity to the display device so that an operator can via at least one of his hands employ the inputting means while clasping the mission system via said gripping means.

12 Claims, 2 Drawing Sheets

MISSION SYSTEM ADAPTED FOR USE IN A STRONGLY DISTURBED ENVIRONMENT PERTURBED BY MOVEMENTS OF THE CARRIER

CROSS-REFERENCE TO RELATED APPLICATIONS

This application is a National Stage of International patent application PCT/EP2012/060163, filed on May 30, 2012, which claims priority to foreign French patent application No. FR 1101683, filed on Jun. 1, 2011, the disclosures of which are incorporated by reference in their entirety.

FIELD OF THE INVENTION

The present invention relates to a mission system. It applies more particularly to the field of the Man-Machine interfaces, commonly designated by the initials MMI, of mission systems in constrained environments.

BACKGROUND

Mission systems allow one or more operators, via one or a plurality of display devices, to view information relating to a mission, for example a terrain map, the indication of information relating to vehicles, devices or people present on the terrain, this information being able to be provided by a variety of sensors such as radars, cameras, detectors, etc. Such systems also allow the operator to input commands, allowing him for example to configure the display which is presented to him, or else to address instructions for the attention of devices or individuals.

For example, for so-called tactical missions, the mission system provides the operators with a synthetic representation of the tactical situation, that is to say objects detected by the sensors, on a cartographic background for example. The MMI of a mission system provides the operators of this system with the means for monitoring the feelers and the effectors through the synthetic representation provided by the system. Such an MMI generally consists of an application executed on a physical device, for example formed by a console having one or more screens some of which may be touchscreens, and one or more devices for inputting instructions.

Mission systems may be deployed on the ground in dedicated buildings, for monitoring drones for example, or else on platforms aboard carriers, for example aircraft, terrestrial vehicles such as tanks or other armored motor vehicles, or else ships. The carriers may thus undergo movements, these latter possibly resulting in diverse constraints at the level of the system and of its operator: notably, abrupt movements, vibrations, loud noise, variable brightness, etc., defining an environment referred to hereinafter as a "constrained environment". The use of the mission system, via a man-machine interface or MMI in a constrained environment may thus turn out to be tricky for the operator; for example, the movements of the carrier may make it difficult to point to objects on a display, or to select menus. It is thus necessary for the systems to be designed so as to minimize the influence of a constrained environment on their use.

It is for example known to resort to an input device of trackball type with which the operator rolls a protruding part of the ball for example with a finger or the palm of his hand. Various buttons may be disposed in proximity to the ball, for example at sites accessible to the tip of the fingers, making it possible to activate diverse actions. The trackball is deemed to be relatively insensitive to the movements of the carrier. However, a drawback of the trackball is related to its high inertia, requiring non-negligible effort on the part of the operator, notably to cause a pointer to travel across the display device, for example with the aim of selecting objects so as to engage actions.

It is also for example known to resort to mission systems using one or a plurality of touchscreens. The applications deployed on this type of device must meet graphical requirements allowing their use in situations of sizable movements and vibrations, and for example under the eventuality that the operator is wearing gloves. Thus, the interaction objects displayed must be defined with sizable dimensions, and their mode of operation must be limited to a single touch or "simple click", and not permit functions such as for example "drag-and-shift" consisting in shifting the object on the screen by keeping a finger pressed on the screen, etc.

Furthermore, in extremely constrained environments, for example when the carrier is an aircraft deploying at very low altitude with possibility of unfavorable weather, or else when the latter is a terrestrial vehicle deploying over rugged terrain, or else when the latter is a ship deploying in rough sea, it is necessary for the operator to hold on to the structure of the carrier in order to avoid falling or impacts, and the latter thus loses the use of one of his hands. The actions can only then be done through a single interaction means, for example via the trackball, a keyboard, a joystick or a touchscreen, thereby appreciably limiting the operator's field of action and requiring an MMI specifically designed in this regard.

SUMMARY OF THE INVENTION

An aim of the present invention is to remedy at least the aforementioned drawbacks, by proposing a mission system allowing an operator to work more conveniently under the difficult conditions imposed by a constrained environment.

The solution proposed by the invention relies on a mission system comprising at least one display device, as well as gripping means judiciously integrated into the system allowing the operator to cling firmly thereto. When the system is fixed to the structure of the carrier by fixing means, such a configuration allows the operator to resist the movements of the carrier, to avoid falls and impacts, while continuing to be able to accurately engage actions via the MMI, for example with the thumbs via interaction objects such as displayed buttons or with other fingers of the hand via physical interaction devices situated for example at the rear of the screen. Operator fatigue during prolonged use is thereby minimized. The software interface can advantageously be designed so as to be adapted in an optimal manner to the mission system.

For this purpose, the subject of the invention is a mission system able to be fixed in a carrier, comprising at least one display device displaying at least mission data, means for inputting instructions by an operator, processing means allowing the execution of applications and an interfacing with said display device and with the inputting means, the mission system being characterized in that it furthermore comprises gripping means disposed in proximity to the display device so that the operator can via at least one of his hands employ the inputting means while clasping the mission system via said gripping means.

In one embodiment of the invention, the display device can comprise at least one touchscreen, said inputting means comprising at least interaction objects displayed on the touchscreen, the interaction objects being disposed on the display area offered by the display device so as to be able to be actuated by the thumbs of the operator when the latter is grasping said gripping means.

In one embodiment of the invention, said interaction objects can be virtual buttons.

In one embodiment of the invention, said inputting means can comprise at least physical interaction devices disposed substantially at the rear of the display device, the physical interaction devices being disposed so as to be able to be actuated by all or some of the operator's fingers other than the thumb, of one or both of his hands.

In one embodiment of the invention, said physical interaction devices can be buttons.

In one embodiment of the invention, said interaction objects can be disposed substantially along circular arcs centered on the bases of the thumbs of the operator when the latter is grasping said gripping means.

In one embodiment of the invention, the mission system can comprise a console supporting said display device, said gripping means being formed at the level of at least one lateral edge of the display device, the latter being designed in such a way that at least part of its lateral edges overhangs the console.

In one embodiment of the invention, the mission system can comprise a console supporting said display device, said gripping means being formed by recesses made in the lateral rims of the console.

In one embodiment, the mission system can furthermore comprise a support frame supporting at least said display device.

In one embodiment of the invention, the support frame can comprise arm rests disposed on the support frame, substantially at the base of the display device and in alignment with the gripping means.

In one embodiment of the invention, the mission system can comprise positioning means configured to orient the inclination of said at least one screen forming the display device.

In one embodiment of the invention, the support frame can be formed by a substantially horizontal tablet, the display device being formed by a first screen in contact with the tablet at its lower edge and inclined by a first angle with respect to a horizontal plane, and a second screen whose lower edge is in contact with the upper edge of said first screen, and inclined by a second angle with respect to the horizontal plane.

BRIEF DESCRIPTION OF THE DRAWINGS

Other characteristics and advantages of the invention will become apparent on reading the description, given by way of example and with regard to the appended drawings which represent.

DETAILED DESCRIPTION

Figure 1:
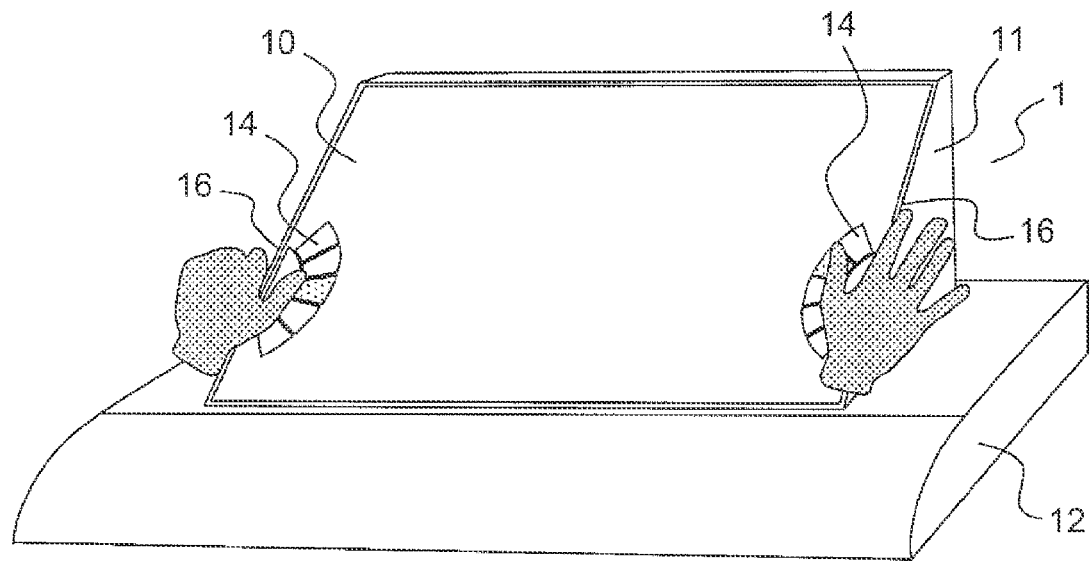
FIG. 1, a perspective view illustrating an exemplary embodiment of a mission system according to one embodiment of the invention.

FIG. 1 presents a perspective view illustrating an exemplary embodiment of a mission system according to one embodiment of the invention. The example illustrated by FIG. 1 is not limiting of the present invention. A mission system 1 can comprise at least one display device 10. The display device can for example be supported by a console 11, the console being able for example to be supported by a support frame 12. The display device 10 can be formed by at least one touchscreen, for example a multipoint touchscreen, that is to say one allowing simultaneous inputting of a plurality of actions by pressing or tapping the fingers at various points of the screen. The console 11 and the support frame 12 can be two distinct elements, or else can form one single element. The support frame 12 can allow the fixing of the entire mission system 1 to the structure of the carrier, for example a wall, not represented in the figure. In this way, by virtue of fixing means, the mission system can be fastened to the structure of the carrier, notably the floor of the latter. The mission system 1 also comprises processing means interfacing notably with the display device 10 and inputting means allowing the operator to input instructions, and allowing the execution of applications. The processing means can for example be implemented in a physical device such as a micro-computer, for example included in the console 11. The inputting means can be formed for example by the tactile surface of the screen of the display device, or possibly by physical control devices, such as buttons, joysticks, tactile surfaces, etc.

According to a specific feature of the present invention, gripping means 16 can allow an operator to remain firmly clasping the mission system 1. In the example illustrated by the figure, the gripping means 16 can be simply formed by the actual structure of the display device 10: for example substantially on the left and right lateral parts of the screen of the display device 10, facing the display area. The structure of the display device 10 can for example overhang the part of the console 11 to which the device is attached, that is to say the left and right lateral rims of the console 11. It is also possible for a single edge of the display device to comprise the gripping means 16.

The screen of the display device 10 can be made in such a way as to exhibit a thickness allowing the operator to place his fingers on either side thereof; more precisely, the operator's thumb can be disposed substantially in the front face of the display device 10, that is to say above the display area, the other fingers being able as necessary to be simultaneously disposed substantially at the rear of the rear face of the display device 10. The gripping means can for example be disposed on both sides of the screen, that is to say on its right and on its left, when it is facing the display area. In this way, it is possible to allow the operator to use one or both his thumbs under their full extension while continuing to clasp, via the gripping means 16, the edges of the screen. Thus, interaction objects such as virtual buttons can for example be selected or actuated by the operator via the thumbs, the operator having the possibility of continuing to clasp on by virtue of the other fingers of the hand that are disposed on the rear face of the display device 10.

The interaction objects or virtual buttons may for example be disposed along a circular arc centered substantially at a point coinciding with the locations envisaged for the bases of the operator's thumbs. Just part of the height of a screen of the display device 10 may be designed in such a way as to form the gripping means 16, or else the whole height of the screen of the display device 10 can be utilized. In the second aforementioned case, various interaction objects or virtual buttons can be disposed over the entire display height, their position being able optionally to be redefined in real time by the processing means, as a function of context.

Advantageously, physical interaction devices such as physical buttons can be disposed in the rear part of the display device 10, the physical interaction devices being able to receive the operator's fingers other than the thumb, that is to say the index, middle, ring or little fingers of one or both hands, when the operator is grasping the gripping means 16. These physical interaction devices can for example be buttons such as push-buttons, pressed to engage particular actions, or actions selected via the display device 10. Thus, one or more push-buttons can be disposed on the back of the display device 10, at the periphery of the area where the operator slips his fingers in order to clasp the display device 10, in order to allow him to trigger actions on the MMI with his fingers while keeping his hold on the display device 10. More complex physical devices can also be envisaged, such as joysticks or else tactile surfaces for example.

The screen of the display device 10 can offer an appropriate inclination with respect to a horizontal plane, so as to facilitate the reading of the data displayed thereon for an operator, according to the latter's planned posture with respect to the screen, for example a standing position or a sitting position. The position and the inclination of the screen of the display device 10 as well as the interaction objects or virtual buttons and the aforementioned physical interaction devices allowing manipulation of the MMI are chosen so as to minimize the muscle fatigue of the shoulders, arms, elbows, forearms, wrists and hands of the operator when the latter is clasping the display device. The area of action of the thumbs of the operator on the screen can be notably designed so as to allow the latter:
 a maximum of actions within the limit of the area covered by the thumbs;
 the most convenient possible access to the actions.

Advantageously, positioning means, formed for example by a pivot link disposed at the base of the screen of the display device 10, can make it possible to vary the latter's inclination. Diverse positioning means can be envisaged in the embodiments where the display device 10 comprises a plurality of screens.

In the exemplary use of the mission system 1 illustrated by FIG. 1, the operator simultaneously uses the two thumbs of his left and right hands respectively, to actuate virtual buttons situated on the left and on the right of the display area offered by the screen of the display device 10. The operator stands clasped by his left hand, and potentially uses the other fingers of his left hand to engage actions via physical interaction devices situated at the rear of the screen.

Figure 2:
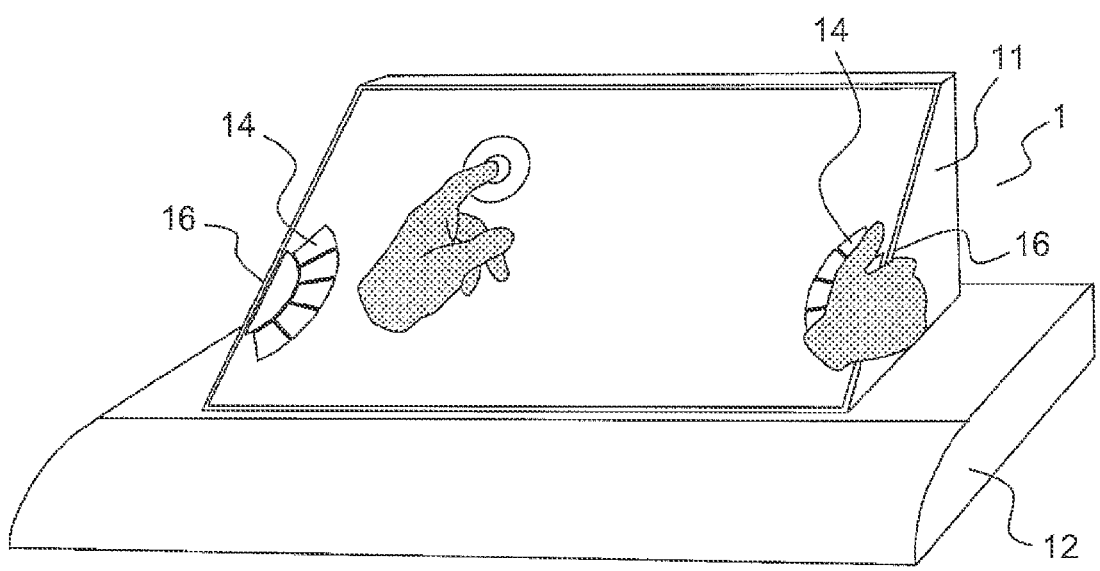
FIG. 2, a perspective view illustrating an exemplary use of a mission system such as illustrated by FIG. 1.

FIG. 2 presents a perspective view illustrating an exemplary use of a mission system 1 such as illustrated by FIG. 1. In the exemplary use illustrated by FIG. 2, the operator is clasping with his right hand, the thumb of which is possibly acting on a virtual interaction object presented on the display area of the screen of the display device 10, and one or more of the other fingers of which are possibly acting on one or more physical interaction devices such as push-buttons situated on the back of the display area. Simultaneously, the operator can point for example with the index finger of his left hand, to a particular point on the display area of the screen of the display device 10.

Figure 3:
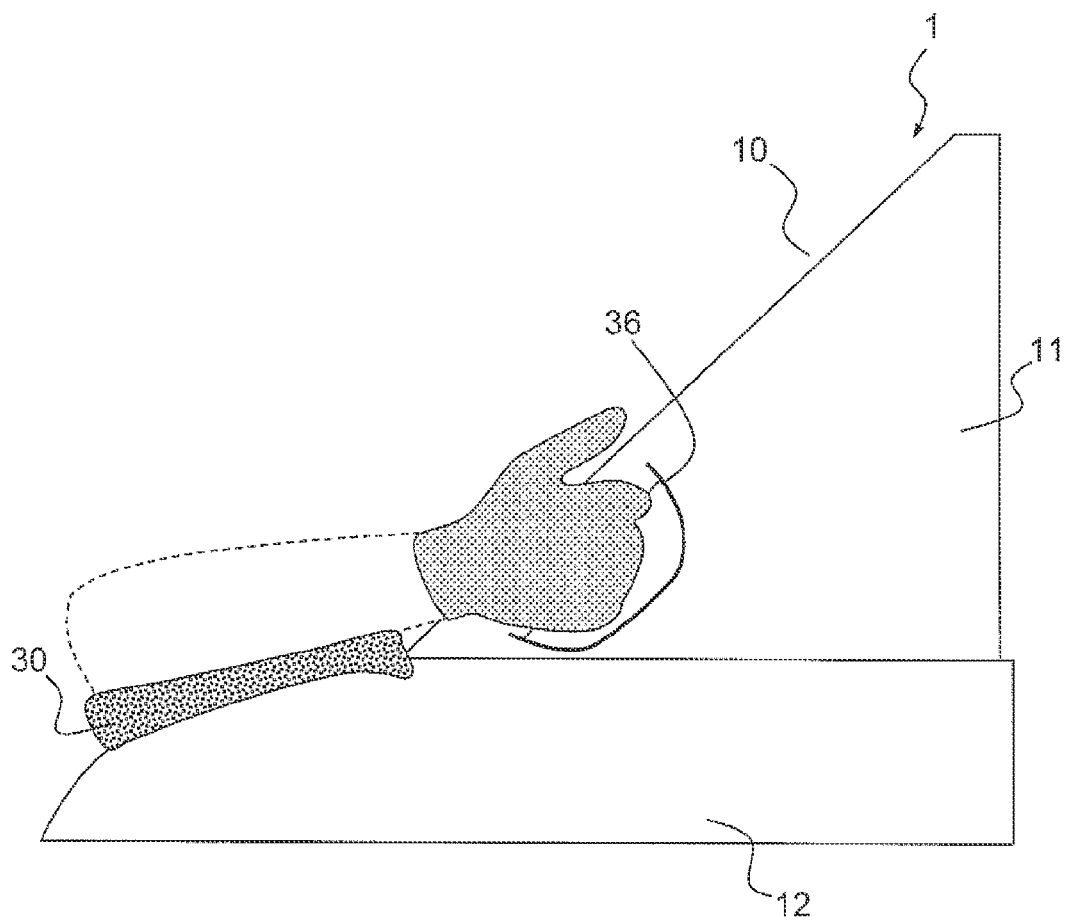
FIG. 3, a profile view illustrating an exemplary mission system according to an advantageous embodiment of the invention.

FIG. 3 presents a profile view illustrating an exemplary mission system according to an advantageous embodiment of the invention.

In a similar manner to the exemplary embodiments described previously with reference to FIGS. 1 and 2, a mission system 1 can comprise at least one console 11 disposed on a support frame 12, the console 11 comprising a display device 10. In the exemplary embodiment illustrated by FIG. 3, the gripping means can be formed on the left and right sides of the display device 10, by recesses 36 accommodating the operator's fingers, the recesses 36 being formed in the lateral rims of the console 11. In this way, it is for example made possible for the edges of the screen of the display device 10 not to overhang the structure of the console 11, the whole then forming a particularly ergonomic structure. The physical interaction devices can be disposed substantially at the bottom of the recesses 36, level with the last phalanges of the operator's fingers, when his hands are disposed in such a way as to clasp the mission system 1 via the gripping means.

Advantageously, in a concern to improve the comfort and the ergonomics of the mission system 1, arm rests 30 can be disposed, for example on the support frame 12, substantially at the base of the display device 10 and in alignment with the gripping means, so as to accommodate the operator's forearms.

It should be observed that the exemplary embodiments described previously with reference to FIGS. 1 to 3 illustrate a display device 10 comprising a single screen. It is however possible for the mission system 1 to comprise a plurality of screens. A particularly advantageous exemplary embodiment of a mission system is described in detail hereinafter.
 The support frame 12 can be fixed to the structure of the carrier and formed by a substantially horizontal tablet, disposed at a height allowing the operator to rest his forearms horizontally;
 the display device 10 can comprise a first touchscreen disposed above the tablet, for example directly in contact with the tablet at its lower edge and inclined by a first angle, for example of about 33 degrees with respect to a horizontal plane;
 the display device 10 can comprise a second touchscreen that may be disposed above the first display device, the lower edge of the second screen being in direct contact with the upper edge of the first screen, the second screen being for example of identical dimensions to those of the first screen, and inclined by a second angle, for example of about 77 degrees with respect to a horizontal plane;
 the thickness of the screens can be chosen substantially between 1 cm and 3 cm;
 the screens can be chosen so that the width of the borders on their right and left lateral edges, between the outer edge of the screen and the tactile display surface, is not greater than 2 cm;
 the gripping means can be disposed on the right and on the left of a screen, or of both screens;
 a push-button or a plurality of push-buttons can for example be disposed on each side of each screen, on the back of the screen, just above the area for placing the hand so as to enable these buttons to be pressed by shifting the index finger of each hand slightly upwards;
 a circular menu such as described previously can be disposed on the MMI displayed on each screen, on each side of the screen, the radius of the circular menu corresponding to the extension of the thumb and being situated:
  for the first screen, at a height allowing the manipulation of the menu with the thumb while clasping the screen with the hand along the axis of the forearm, the latter resting horizontally on the tablet;
  for the second screen, in the lower corner of the screen.

Of course other embodiments are conceivable, in which for example a single chassis can contain a mission system such as described previously, associated for example with a seat or a backrest making it possible to accommodate the operator respectively in a sitting or standing position, etc.

An advantage of the previously described embodiments of the invention for the operator is the ability that it offers him to hold the display device with one or the other of his two hands, or indeed both if necessary, while continuing to manipulate the MMI. Within this framework, the use of a touchscreen with a specific design of MMI offers the operator a more sizable field of action and greater accuracy while minimizing manipulation effort with respect to the known solutions. In this way, the operator can continue to manipulate the MMI effortlessly and accurately in difficult or indeed extreme situations of strong movements or sizable vibrations of the carrier without running the risk of impact or fall.

The invention claimed is:

1. A mission system configured to be fixed in a vehicle, comprising:
    a display device displaying at least mission data,
    device for inputting instructions by an operator,
    processing device allowing the execution of applications and an interfacing with said display device and with the inputting device,
    the mission system further comprising a fastening device configured to join the mission system together with the vehicle structure in a given position, and gripping means arranged with respect to the display device such that when the mission system is fastened to the vehicle structure, the operator can operate the inputting device with at least one of his hands while holding on to the vehicle structure by grasping said gripping means.

2. The mission system as claimed in claim 1, in which the display device comprises at least one touchscreen, said inputting device comprising at least interaction objects displayed on the touchscreen, the interaction objects being disposed on the display area offered by the display device so as to be able to be actuated by the thumbs of the operator when the latter is grasping said handle.

3. The mission system as claimed in claim 2, in which said interaction objects are virtual buttons.

4. The mission system as claimed in claim 2, in which said interaction objects are disposed substantially along circular arcs centered on the bases of the thumbs of the operator when the latter is grasping said handle.

5. The mission system as claimed in claim 1, in which said inputting device comprises at least physical interaction devices disposed substantially at the rear of the display device, the physical interaction devices being disposed so as to be able to be actuated by all or some of the operator's fingers other than the thumb, of one or both of his hands.

6. The mission system as claimed in claim 5, in which the physical interaction devices are buttons.

7. The mission system as claimed in claim 1, further comprising a console supporting said display device, said handle being formed at the level of at least one lateral edge of the display device, the latter being designed in such a way that at least part of its lateral edges overhangs the console.

8. The mission system as claimed in claim 1, further comprising a console supporting said display device, said handle being formed by recesses made in the lateral rims of the console.

9. The mission system as claimed in claim 1, further comprising a support frame supporting at least said display device.

10. The mission system as claimed in claim 9, in which the support frame comprises arm rests disposed on the support frame, substantially at the base of the display device and in alignment with the handle.

11. The mission system as claimed in claim 9, in which the support frame is formed by a substantially horizontal tablet, the display device being formed by a first screen in contact with the tablet at its lower edge and inclined by a first angle with respect to a horizontal plane, and a second screen whose lower edge is in contact with the upper edge of said first screen, and inclined by a second angle with respect to the horizontal plane.

12. The mission system as claimed in claim 1, further comprising positioning device configured to orient the inclination of said at least one screen forming the display device.

* * * * *